(12) United States Patent
Keesara et al.

(10) Patent No.: US 10,404,489 B2
(45) Date of Patent: Sep. 3, 2019

(54) SYSTEMS AND METHODS FOR BOOTSTRAPPING MULTICAST STATE WITHOUT USING A NICK-NAME

(71) Applicant: Extreme Networks, Inc., San Jose, CA (US)

(72) Inventors: Srikanth Keesara, Tewksbury, MA (US); Gautam Khera, Sugarland, TX (US)

(73) Assignee: EXTREME NETWORKS, INC., San Jose, CA (US)

( * ) Notice: Subject to any disclaimer, the term of this patent is extended or adjusted under 35 U.S.C. 154(b) by 0 days.

(21) Appl. No.: 15/966,610

(22) Filed: Apr. 30, 2018

(65) Prior Publication Data

US 2019/0222441 A1     Jul. 18, 2019

Related U.S. Application Data

(60) Provisional application No. 62/616,903, filed on Jan. 12, 2018.

(51) Int. Cl.
*H04L 12/46* (2006.01)
*H04L 12/761* (2013.01)
*H04L 12/741* (2013.01)
*H04L 12/721* (2013.01)

(52) U.S. Cl.
CPC ........ *H04L 12/4633* (2013.01); *H04L 12/462* (2013.01); *H04L 45/16* (2013.01); *H04L 45/74* (2013.01); *H04L 45/66* (2013.01)

(58) Field of Classification Search
CPC ... H04L 12/4633; H04L 45/74; H04L 12/462; H04L 45/16; H04L 45/66; H04L 12/4625; H04L 12/4641; H04L 45/38
See application file for complete search history.

(56) References Cited

U.S. PATENT DOCUMENTS

| 2008/0228943 | A1* | 9/2008 | Balus | H04L 12/462 709/239 |
| 2011/0317703 | A1* | 12/2011 | Dunbar | H04L 12/462 370/392 |
| 2012/0014386 | A1* | 1/2012 | Xiong | H04L 29/12028 370/392 |

(Continued)

OTHER PUBLICATIONS

Shortest Path Bridging: Efficient Control of Larger Ethernet Networks by Allan et al. (Year: 2010).*

*Primary Examiner* — Dady Chery
(74) *Attorney, Agent, or Firm* — Sterne, Kessler, Goldstein & Fox P.L.L.C.

(57) ABSTRACT

Systems and methods are presented herewith for automatically assigning a Multicast Backbone Media Access Control ("BMAC") address to a switch (or a similar network device) newly-added to a network. Media Access Control ("MAC") addresses (unicast addresses) that are assigned by default to the switch may be used in a process to generate a multicast BMAC address and assign the multicast BMAC address to the switch, thereby, automatically enabling communications with other network devices over the SPB network. The process involves modifying a bit of a selected unicast address to transform the address into a multicast address. The system may use the modified MAC address as the multicast BMAC address.

20 Claims, 4 Drawing Sheets

(56) References Cited

U.S. PATENT DOCUMENTS

| | | | |
|---|---|---|---|
| 2012/0113717 A1* | 5/2012 | Shibata | G06F 11/1068 365/185.03 |
| 2012/0243544 A1* | 9/2012 | Keesara | H04L 12/4633 370/395.53 |
| 2013/0077624 A1* | 3/2013 | Keesara | H04L 12/4662 370/390 |
| 2013/0077625 A1* | 3/2013 | Khera | H04L 12/4625 370/390 |
| 2014/0369184 A1* | 12/2014 | Keesara | H04L 12/4658 370/221 |

\* cited by examiner

US 10,404,489 B2

SYSTEMS AND METHODS FOR BOOTSTRAPPING MULTICAST STATE WITHOUT USING A NICK-NAME

CROSS REFERENCE TO RELATED APPLICATION

This application claims the benefit of U.S. Provisional Patent Application No. 62/616,903, filed Jan. 12, 2018, which is hereby incorporated by reference in its entirety.

BACKGROUND

Historically, network device configuration has been a manual and lengthy process. An administrator had to physically connect a cable to the device to configure it while being next to the device. This has been especially true for those devices that need Shortest Path Bridging configuration. Although, various systems have been built to enable automatic configuration of network devices as those devices are connected to the network (e.g., automatic Internet Protocol Configuration), currently available systems do not have the ability to automatically configure certain parameters for devices in a Shortest Path Bridging Media Access Control ("SPBM") network.

SUMMARY

Systems and methods are presented herewith for automatically assigning a multicast Backbone Media Access Control Address ("BMAC") address to a switch that is newly-added to a network. Media Access Control ("MAC") addresses that are assigned by default to the switch may be used in a process to generate the multicast BMAC address and assign the multicast BMAC address to the switch, thereby, automatically enabling communications with other network devices over the Shortest Path Bridging ("SPB") network. The process involves modifying a bit of a selected unicast MAC address to transform the address into a multicast BMAC address. The system may use the modified MAC address to enable applications to communicate via the SPB network.

Control circuitry built into a switch may perform the actions required by the process. Specifically, the control circuitry may perform the following actions in order to automatically generate the multicast BMAC address. The control circuitry of the switch may detect that the switch has been newly-added to a network. For example, the control circuitry may detect that the switch has been powered on, and/or that a default configuration resides in the switch's memory. In some embodiments, the control circuitry may determine that the switch does not have an assigned multicast BMAC address to detect that the switch has been newly-added to the network.

In response to detecting that the switch has been newly-added to the network, the control circuitry may retrieve a plurality of Media Access Control addresses assigned to the switch by default. For example, each switch may be configured with default MAC addresses (e.g., by the manufacturer). Those MAC addresses may be stored in non-volatile memory of the switch and retrieved from that memory by the control circuitry.

The control circuitry may select a MAC address from the plurality of MAC addresses. For example, the control circuitry may select a random MAC address or a MAC address of a management port if one is specifically assigned to the management port.

The control circuitry may access, in the MAC address, bit 40 that indicates whether the MAC address is a unicast address or a multicast address. For example, the control circuitry may iterate through the bits of the selected MAC address and identify bit 40 (also known as a group address).

The control circuitry may modify the bit in the MAC address to transform the MAC address into a multicast MAC address. For example, the control circuitry may change the bit from 0 (indicating a unicast address) to 1 (indicating a multicast address or a group address).

The control circuitry may generate, based on the transformed MAC address, a multicast BMAC address. For example, the control circuitry may store the modified address as a multicast BMAC address and assign the multicast BMAC address to the switch. For example, the control circuitry may store the modified MAC address in a portion of non-volatile memory that stores a multicast BMAC address.

In some embodiments the multicast BMAC address may be propagated throughout the network so that other network devices are able to communicate using the SPB encapsulation with the switch. Specifically, the control circuitry (or another application) may add the multicast BMAC address to an entry of a database. The database may reside on the switch and may be used to propagate SPB network information to other devices in the network. One example of such a database is the Link State Database ("LSDB").

A process on the switch may transmit a signal onto the network to propagate the information within the entry to nodes connected to the network. For example, a process on the switch may transmit a link state packet ("LSP") to signal other network devices to retrieve the entry from the database (e.g., LSDB) containing the newly-assigned multicast BMAC address.

In some embodiments bit 40 may be modified to transform the unicast MAC address into a multicast address. Specifically, the control circuitry may iterate through the bits of the MAC address until bit 40 is reached and modify bit 40 of the MAC address (e.g., change from 0 to 1).

In some embodiments, the switch may signal, with the modified MAC address, that the modified MAC address is globally unique. For example, in current implementations MAC addresses that are globally unique have bit 41 set to a value of 0 while locally administered MAC addresses have bit 41 set to 1. Thus, the switch may maintain bit 41 set at 0 to indicate that the modified MAC address is globally unique.

In some embodiments, the switch may transmit a signal to the other network devices (e.g., in the SPB network) to construct SPB forwarding paths to the switch using the multicast BMAC address. For example, the switch may transmit a signal that includes a link state packet that includes the multicast BMAC address in a Type-Length-Value ("TLV") format. In some embodiments, other information may be included in the link state packet (e.g., Virtual Local Area Network ("VLAN") identifier, service instance identifier ("I-SID") or other suitable information.

In some embodiments, a switch may be configured to process the LSP packet with the multicast BMAC address. Specifically, a second switch may receive the link state packet from a plurality of switches in the SPB Network, and determine that the link state packet contains the TLV for the multicast BMAC address. In response to determining that the link state packet contains the TLV for the multicast BMAC address, the second switch treats each of the plurality of the switches as a transmitter for its own multicast BMAC address and as a receiver for the multicast BMAC address of the other switches. In this scenario, the second switch will be able to receive multicast packets for the switch with the newly-generated multicast BMAC address and forward those packets according to SPB network rules.

In some embodiments, when signaling, to the network, that a plurality of SPB devices in the network should both transmit and receive packets for the multicast BMAC address, the switch may transmit a Type-Length-Value ("TLV") for the multicast BMAC address with both a transmit bit ("TX") and a receive bit ("RX") bit set to 1. In some embodiments, the control circuitry may, when detecting that the switch has been newly-added to the network, detect that the switch does not have an assigned multicast BMAC address. For example, the control circuitry may query the switch's non-volatile memory for the multicast BMAC address and receive a NULL value.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
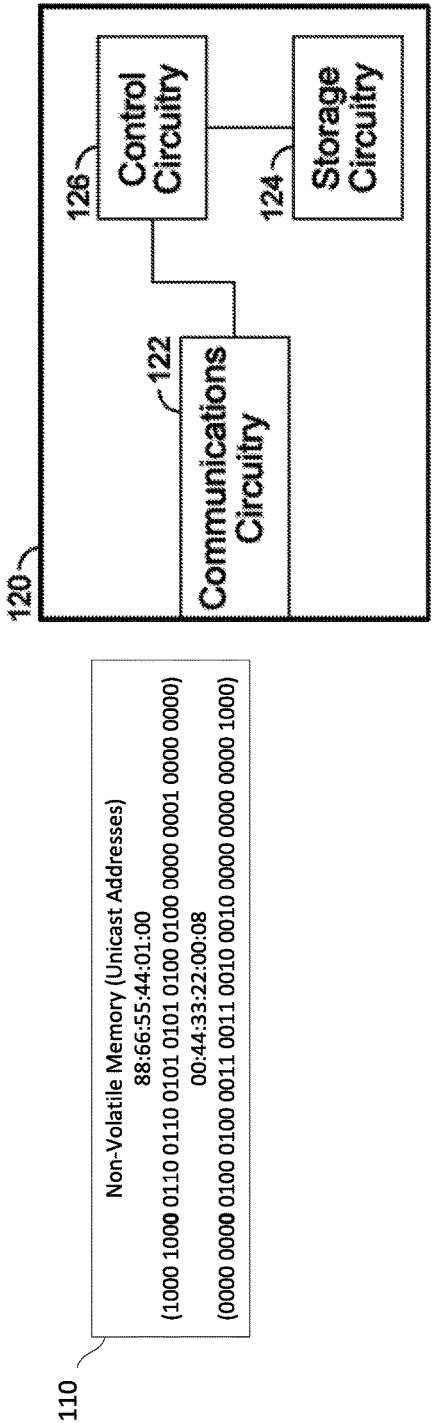
FIG. 1 depicts an illustrative network switch, where the switch may automatically configure its own SPBM nickname, in accordance with some embodiments of the disclosure.

Forwarding state for multicast traffic in Shortest Path Bridging Media Access Control ("SPBM") networks is represented by multicast Back Bone Media Access Control Address ("BMAC") records. The components of the multicast BMAC address include (1) a 20-bit Shortest Path Source Identifier ("SPSourceID"), which is sometimes known as an SPBM nick-name, and (2) a 24-bit service instance identifier ("I-SID") with the other 4 bits in the address taking on a fixed value. The fixed value includes bit 41 being set to a value of 1 treating the MAC address as locally administrated. The SPSourceID represents an Ingress Backbone Edge Bridge ("BEB") that is injecting the multicast traffic into the network. The SPSourceID is used to identify the shortest path tree (rooted at the ingress BEB) that the traffic must follow in the SPBM Network. The I-SID represents a traffic flow and is used to prune the traffic from going along paths in the core of the network towards nodes that do not subscribe to the flow. The SPSourceID must be unique and the uniqueness of the SPSourceID ensures that the traffic follows the correct path in the network. It should be noted that the term "nickname" and the term "nick-name" are used interchangeably herein and have the same meaning.

When a network device (e.g., a switch) is aware of the SPSourceID that has been assigned, it can properly service all the network traffic that it must originate into the SPBM network. However, the requirement to have a unique SPSourceID poses problems in plug and play environments where a network device is inserted into the network without any configuration and must obtain its basic SPB configuration parameters from boot strapping services that are reachable in-band via the SPBM network before it becomes aware of the unique SPSourceID that it has been assigned. This initial communication requires the use of IP and/or IPv6 applications between the network device and the boot strapping server(s) before the network device discovers its SPSourceID. But because some of the in-band communication requires multicast state—the network device cannot participate without an SPSourceID.

Thus, it is desirable to enable automatic configuration of certain Shortest Path Bridging ("SPB") parameters (e.g., an SPSourceID) for new network devices when those devices are added to a network. However, there does not exist an efficient automatic way to do so.

Therefore, systems and methods are disclosed herein for adding SPB parameters to a network device newly-added to a network. Generally, the process for adding SPB parameters to a network device may be performed by control circuitry on that device. The process may include selecting a unicast Media Access Control address from a pool assigned to the switch, and transforming that MAC address into a multicast MAC address by modifying bit 40 of the selected unicast MAC address from a value of 0 to a value of 1, to indicate that it is now a group address. The control circuitry may add that address to its own Link State Database ("LSDB"), which enables this address to be disseminated to other network devices (e.g., neighboring switches) using Link State Packets ("LSPs"). A network device may receive an LSP with the newly-created multicast MAC address and use that address to build a forwarding state for the multicast MAC address using SPB rules.

Specifically, the control circuitry may retrieve MAC addresses assigned to the network device (e.g., by the manufacturer), and select one of those addresses to create a multicast address for the switch during this process. It should be noted that a MAC address is a layer 2 address that is made up of 48 bits. Bit 40 indicates whether the MAC address is a unicast address or a group address (i.e., multicast address). It should also be noted that bit 41 indicates whether the MAC address is globally unique (e.g., assigned by the manufacturer) or locally administrated (e.g., assigned by the operator). The control circuitry may select any unicast MAC address that is assigned to the switch. The control circuitry may transform the selected unicast MAC address by modifying bit 40 of the unicast MAC address from a value 0 to a value 1. Because the unicast MAC address is unique, the newly-derived multicast address is unique, and therefore, bit 41 remains set at 0.

The control circuitry publishes the newly-derived multicast MAC address in the LSDB database. The LSDB database then enables other devices to receive the multicast MAC address, thereby, enabling SPB communications between the newly-added network device and other network devices in the network. The control circuitry may signal other devices in the network to construct forwarding paths to the newly-added network device. Specifically, a signal is transmitted that include the LSP with the newly-generated multicast address. Once the LSP is received by other network devices participating in the network, forwarding path computations are executed as a normal protocol action. When the newly-generated multicast address is encountered during the computation, a forwarding record for this newly-generated multicast address is computed and installed into forwarding tables on the respective network devices. Because the newly-added network device transmits multicast packets with the newly-generated multicast MAC address, other network devices may be reached.

When an existing network device receives the newly-generated multicast MAC address that device, the existing device computes a path (or a best path) to the newly-added device using multicast computing rules. Generally, SPB multicast computing rules use an SPBM nick-name and a I-SID to compute a path to a network device (e.g., a forwarding state for the device). Specifically, each network device that is configured to transmit or receive for a specific I-SID includes that I-SID in its LSDB together with Type-Length-Values ("TLVs") defined for that I-SID. The information also includes for each I-SID value, a transmit ("TX") bit and a receive ("RX") bit. The computation of the forwarding state for a given SPBM nick-name and I-SID combination is performed if the device with that SPBM nick-name advertised the I-SID with TX bit set to the value of 1. As a result, a forwarding record for the SPBM nick-name and I-SID combination includes all other network devices that advertised the combination with an RX bit set to the value of 1 and for which the network device that is performing the computation is in the path between the transmitting node and the receivers. Further information on this may be found in Internet Engineering Task Force RFC-6329 and IEEE-802.1Q standards which are hereby incorporated by reference herein.

The same rules may be used to build a multicast forwarding path for the newly-added MAC address. The existing network device (e.g., a switch) may use shortest path forwarding to construct forwarding records for the newly-generated multicast address. That is, each network device that transmits a TLV carrying the newly-generated multicast address is treated as both transmitter and receiver for that kind of address from every other network device that transmit the TLV. When sets of transmitters and receivers are established, the same rules described above are used to compute the forwarding record for the newly-generated multicast address. Specifically, each existing network device may use the IS-IS LSPs it publishes to request construction of multicast state for the newly-generated multicast MAC address. The computation of the state for this MAC address treats others SPBM network devices with a similar request as receivers for traffic using this multicast MAC address. Signaling this in the LSPs may require using proprietary TLV/Sub-TLV if current TLVs (Type Length Value) do not accommodate the process described herein. For example, TLV 147 (MAC reachability) may be used for this process. MAC reachability is described in more detail in Internet Engineering Task Force RFC-6165. Although, this TLV is generally used for unicast addresses, the newly-generated multicast MAC address may be stored in this TLV. It should be noted that other TLVs may be used for this process.

As a result of this process, a packet sent out by the newly-added network device can be received on any other network device enabling communication to and from the newly-added device. The multicast state represented by these specially constructed multicast BMAC addresses can be used in combination with a reserved I-SID to create a L2 (Layer-2) service that is internal to the SPBM network. All the switches in the SPBM network could join this I-SID. A network device is able to create a Local Area Network ("LAN") interface and attach it to the Layer 2 ("L2") service represented by this I-SID. This would then allow for the deployment of IP based applications that support bootstrapping of switches (for example an application that assigns nick-names) into the SPBM network. In addition, it should be noted that bootstrap applications that rely on VLAN-1 and Spanning Tree protocol may be replaced by SPBM application designed around the disclosed process.

FIG. 1 depicts an illustrative network switch, where the switch may automatically configure its own multicast BMAC address, in accordance with some embodiments of the disclosure. Switch 120 includes illustrative components, such as communications circuitry 122, storage circuitry 124, and control circuitry 126. These components may be implemented by any switch. Communications circuitry 122 may be any known receiver, transmitter, transceiver, or any other known means of transmitting and/or receiving data. Storage circuitry 124 may be any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc. Control circuitry 126 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 126 executes instructions stored in memory (i.e., storage circuitry 124). Storage circuitry 124 may include non-volatile memory (e.g., flash, magnetic disk, solid state drives, and other suitable memory) for storing switch configuration information. For example, non-volatile memory may store unicast MAC addresses 110 assigned by default to the switch. The unicast MAC addresses may be assigned to the switch by a manufacturer or another entity preparing the switch for customer use.

Figure 3:
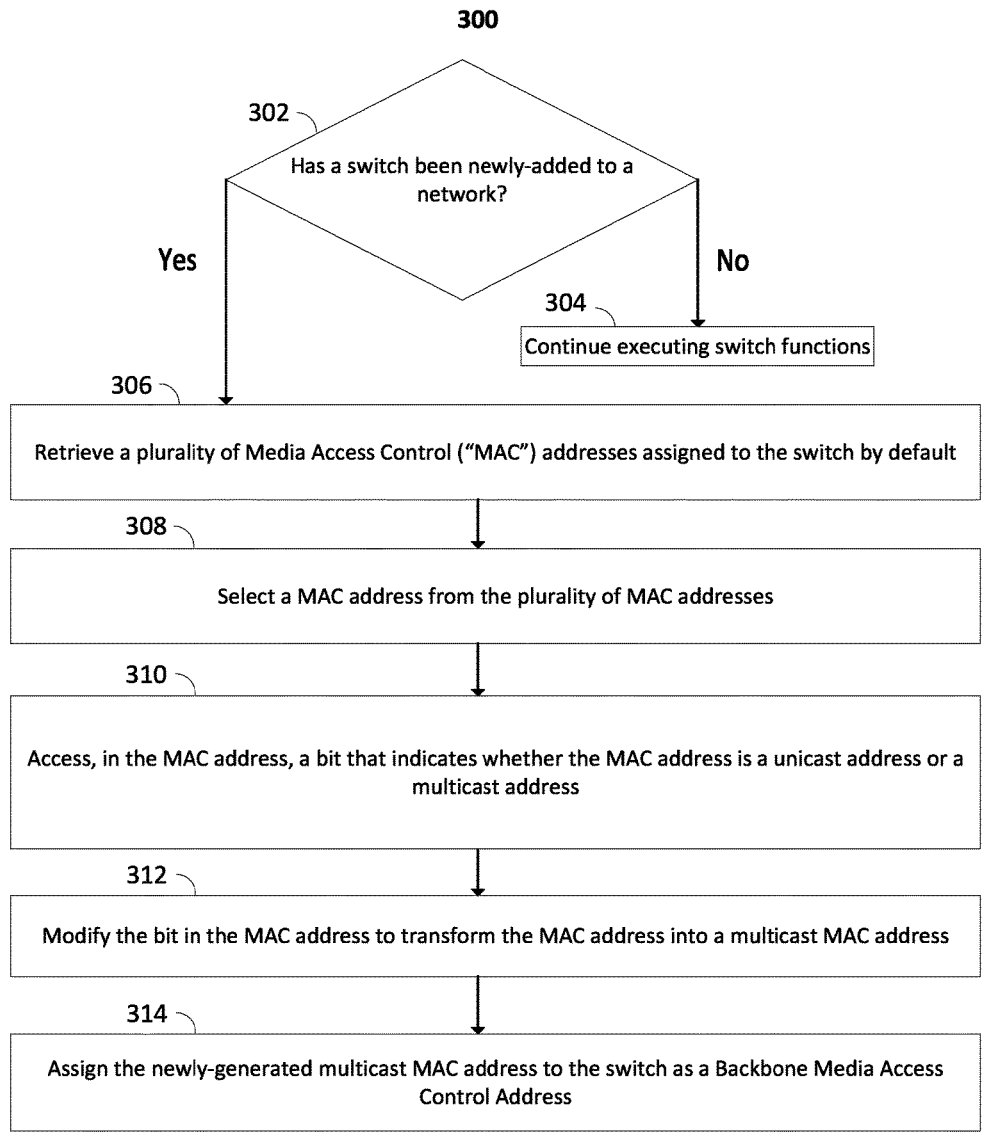
FIG. 3 depicts an illustrative flow chart showing actions for automatically assigning a multicast BMAC address to a switch that is newly-added to a network, in accordance with some embodiments of the disclosure.

FIG. 3 depicts an illustrative process 300 for automatically assigning a multicast BMAC address to a switch that is newly-added to a network, in accordance with some embodiments of the disclosure. At 302, control circuitry 126 determines whether the switch has been newly-added to a network. For example, the control circuitry may access storage circuitry 124 and determine whether a multicast BMAC address is stored in an appropriate location. In another example, control circuitry 126 may determine whether the switch has a default configuration (e.g., by accessing a proper location in storage circuitry 124.

If control circuitry 126 determines that the switch is not newly-added to a network, control circuitry 126 may continue to action 204 where the control circuitry proceeds with executing switching functions. For example, if the control circuitry is executing a start-up routine on the switch, the control circuitry may determine whether the switch is newly-added to the network (e.g., needs an SPBM configuration). If the switch is not new, the start-up routine may continue.

If control circuitry 126 determines that the switch has been newly-added to the network, control circuitry 126 executes a process to assign a multicast BMAC address to the switch. At 306, control circuitry 126 retrieves a plurality of Media Access Control addresses assigned to the switch by default. For example, box 110 illustrates possible MAC addresses assigned to a switch by default as they may be stored in non-volatile memory. Those MAC addresses may be stored in hexadecimal notation and/or binary notation as demonstrated in box 110. It should be noted that more MAC addresses can be stored in the memory (e.g., storage circuitry 124).

At 308, control circuitry 126 selects a MAC address from the plurality of MAC addresses. For example, the control circuitry may access storage circuitry 124 (e.g., non-volatile memory) and select address 88:66:55:44:01:00 (1000 1000 0110 0110 0101 0101 0100 0100 0000 0001 0000 0000) or address 00:44:33:22:00:08 (0000 0000 0100 0100 0011 0011 0010 0010 0000 0000 0000 1000), as illustrated in box 110. It should be noted that any MAC address assigned to switch 120 by default may be selected.

At 310, control circuitry 126 accesses, in the MAC address, a bit that indicates whether the MAC address is a unicast address or a multicast address. For example, in current systems bit 40 (shown in bold in box 110) indicates whether the MAC address I a unicast MAC address (value of 0) or a multicast/group address (value set to 1). As illustrated in box 110 (by bits presented in bold), two MAC addresses are available for selecting.

Figure 2:
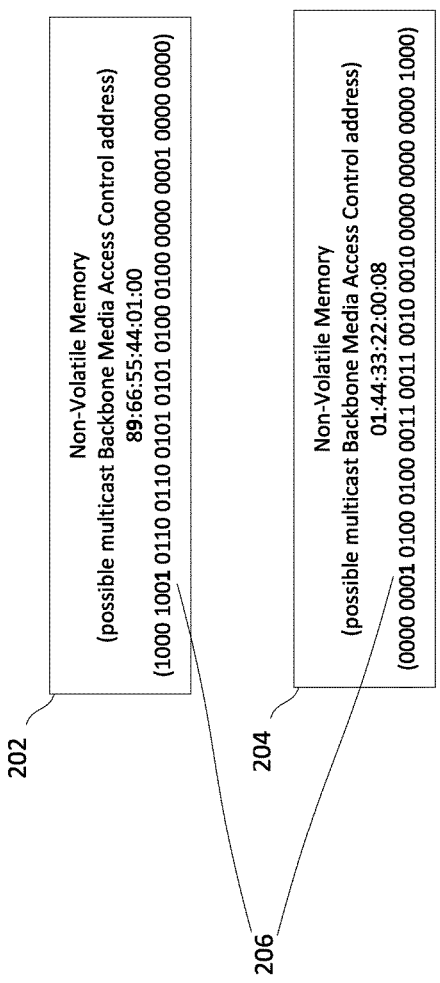
FIG. 2 depicts illustrative portions of non-volatile memory with examples of possible multicast BMAC addresses, in accordance with some embodiments of the disclosure.

At 312, control circuitry 126 modifies the bit in the MAC address to transform the MAC address into a multicast MAC address. For example, the control circuitry 126 may modify bit 40 from a value of 0 to a value of 1. FIG. 2 depicts illustrative portions of non-volatile memory with examples of possible multicast BMAC addresses in accordance with some embodiments of the disclosure. If the control circuitry chooses MAC address 88:66:55:44:01:00 (1000 1000 0110 0110 0101 0101 0100 0100 0000 0001 0000 0000), the control circuitry may modify bit 40 of that address from the value 0 to a value 1. Box 202 illustrates a transformed address (i.e., a possible multicast BMAC address for the switch) as 89:66:55:44:01:00 (1000 1001 0110 0110 0101 0101 0100 0100 0000 0001 0000 0000). If the control circuitry chooses MAC address 00:44:33:22:00:08 (0000 0000 0100 0100 0011 0011 0010 0010 0000 0000 0000 1000), the control circuitry may modify bit 40 of that address from the value 0 to a value 1. Box 204 illustrates a transformed address (i.e., a possible multicast BMAC address for the switch) as 01:44:33:22:00:08 (0000 0001 0100 0100 0011 0011 0010 0010 0000 0000 0000 1000). Element 206 illustrates a bit of the address in box 110 that was modified.

At 314, control circuitry 126 assigns the newly-generated multicast MAC address to the switch as a Multicast Backbone Media Access Control Address. For example, the control circuitry may store the modified MAC address in a location in non-volatile memory that indicates that the stored value is the multicast BMAC address.

Figure 4:
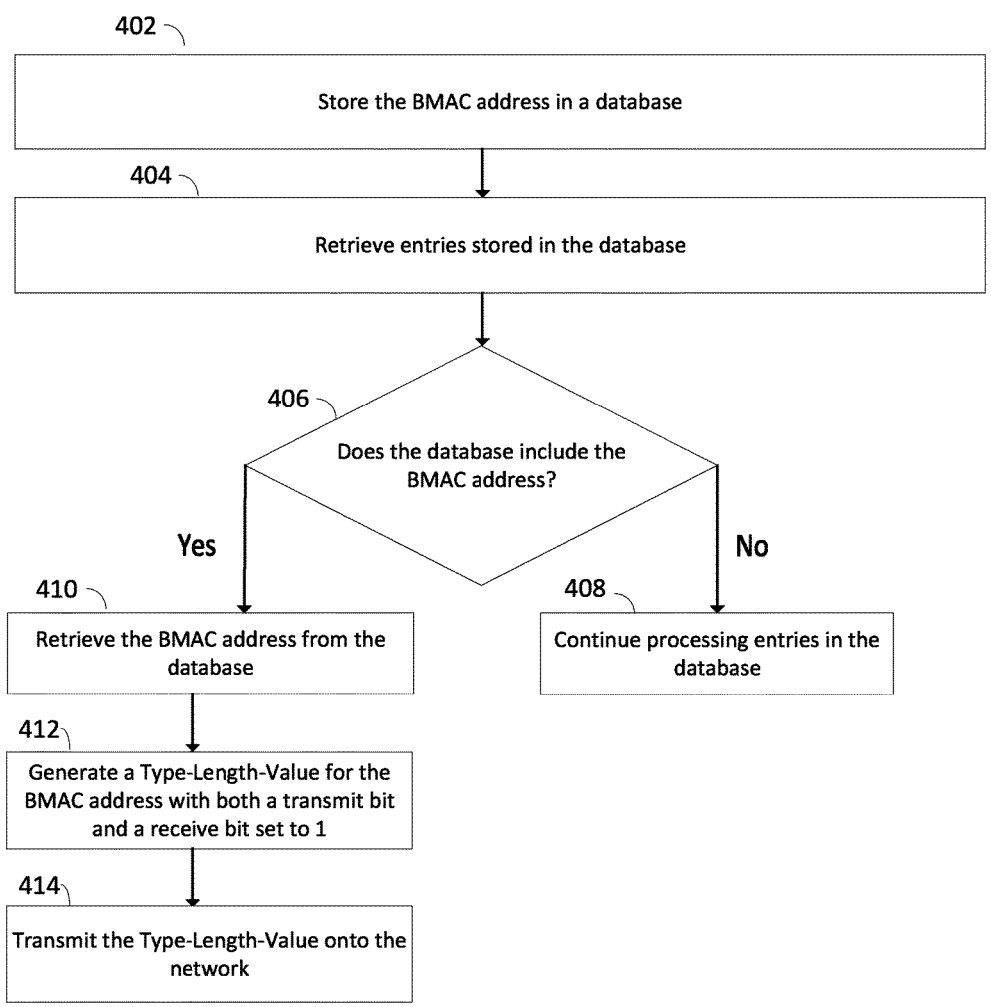
FIG. 4 depicts an illustrative flow chart showing actions for propagating the multicast BMAC address onto a network, in accordance with some embodiments of the disclosure.

FIG. 4 depicts process 400 showing actions for propagating the multicast BMAC address onto a network, in accordance with some embodiments of the disclosure. At 402, control circuitry 126 stores the multicast BMAC address in a database. For example, the control circuitry may store the SPBM nickname in a Link State Database that may be located in storage circuitry 124.

At 404, control circuitry 126 retrieves entries stored in the database. For example, the control circuitry may retrieve from a Link State Database (e.g., residing in storage circuitry 124) entries from the database. At 406, control circuitry 124 determines whether the database includes the multicast BMAC address. For example, the multicast BMAC address entry in the database may have an associated flag. In some embodiments, the control circuitry may compare each entry in the Link State Database with each MAC address assigned to the switch to determine whether an entry in the database is based on a MAC address assigned to the switch. If the control circuitry determines that the database does not include the multicast BMAC address, process 400 moves to 408, where the control circuitry processes the entries in the database. For example, the control circuitry may generate link state packets for each entry in the database.

If the control circuitry determines that the database does include the multicast BMAC address process, 400 moves to action 410 where the control circuitry retrieves the multicast BMAC address from the database. For example, the control circuitry may retrieve the database entry containing the multicast BMAC address and access a field with that address.

At 412, control circuitry 126 generates a type-length-value for the multicast BMAC address with both a transmit bit and a receive bit set to 1. For example, the control circuitry may access a template for creating the Type-Length-Value and generate the Type-Length-Value by adding the multicast BMAC address and the transmit and receive bits to the appropriate places within the template.

At 414, control circuitry 126 transmits the Type-Length-Value onto the network. For example, the control circuitry may use communications circuitry 122 for transmission.

Figure 5:
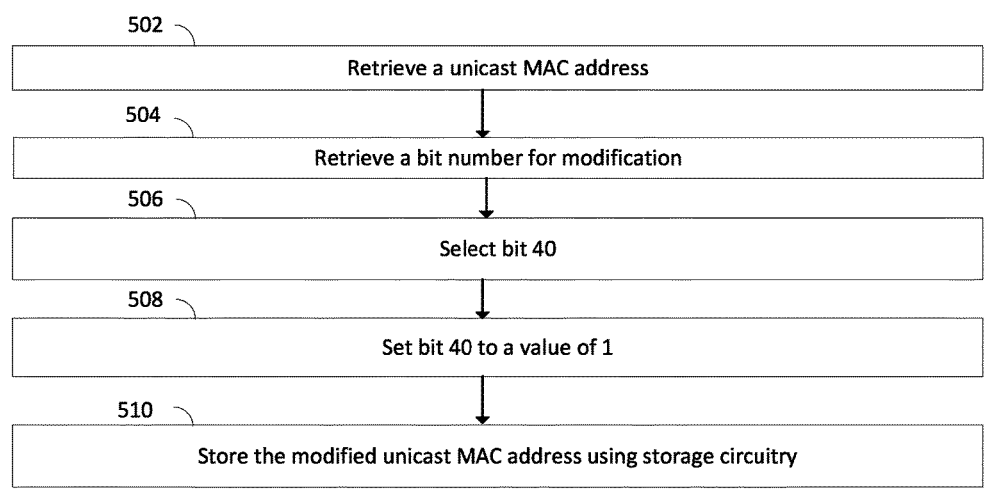
FIG. 5 depicts an illustrative flowchart showing actions for modifying a unicast MAC address to transform the unicast MAC address into multicast BMAC address, in accordance with some embodiments of the disclosure.

FIG. 5 depicts an illustrative flowchart showing actions for modifying a unicast MAC address to transform the unicast MAC address into an SPBM nickname, in accordance with some embodiments of the disclosure. At 502, control circuitry 126 retrieves a unicast MAC address. For example, the control circuitry may retrieve the unicast MAC address from non-volatile memory (e.g., storage circuitry 124).

At 504, control circuitry 126 retrieves a bit number for modification. For example, the control circuitry may retrieve a value from storage circuitry 124 that corresponds to a bit number within the unicast MAC address to modify (e.g., bit number 40).

At 506, control circuitry 126 selects bit 40 of the unicast MAC address. For example, the control circuitry may iterate through each bit of the unicast MAC address in ascending order starting from a first bit until bit 40 is reached. At 508, control circuitry 126 sets bit 40 to a value of one. At 510, control circuitry 126 stores the modified unicast MAC address using storage circuitry. For example, the control circuitry may store the modified MAC address in non-volatile memory.

For brevity, elements of processes 300-500 that were described in detail with respect to FIGS. 1 and 2 are not repeated in the description of FIGS. 3-5, but those above-described elements are intended to carry into their respective descriptions of FIGS. 3-5.

The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

While some portions of this disclosure may make reference to "convention," or "related art," any such reference is merely for the purpose of providing context to the invention(s) of the instant disclosure, and does not form any admission, express or implied, as to what constitutes the state of the prior art. As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

What is claimed is:

1. A method for automatically assigning a multicast Backbone Media Access Control ("BMAC") address to a switch that is newly-added to a network, the method comprising:
   detecting that the switch has been newly-added to the network;
   in response to detecting that the switch has been newly-added to the network:
      retrieving a plurality of Media Access Control ("MAC") addresses assigned to the switch by default;
      selecting a MAC address from the plurality of MAC addresses;
      accessing, in the MAC address, a bit that indicates whether the MAC address is a unicast address or a multicast address;
      modifying the bit in the MAC address to transform the MAC address into a multicast MAC address;
      generating, based on the transformed MAC address, a multicast BMAC address; and
      assigning the multicast BMAC address to the switch.

2. The method of claim 1, further comprising:
   adding the multicast BMAC address to an entry of a database; and
   transmitting a signal onto the network to propagate information within the entry to nodes connected to the network.

3. The method of claim 1, wherein modifying the bit in the MAC address to transform the MAC address into the multicast MAC address comprises modifying bit 40 of the MAC address.

4. The method of claim 1, further comprising signaling with the modified MAC address that the modified MAC address is globally unique.

5. The method of claim 4, wherein signaling with the modified MAC address that the modified MAC address is globally unique comprises maintaining bit 41 set at 0 to indicate that the modified MAC address is globally unique.

6. The method of claim 5, wherein the signal comprises a link state packet that includes the multicast BMAC address in a Type-Length-Value ("TLV") format.

7. The method of claim 6, further comprising:
   receiving, at a second switch, the link state packet;
   determining that the link state packet contains the TLV for the multicast BMAC address; and
   in response to determining that the link state packet contains the TLV for the multicast BMAC address, updating, using the second switch, a multicast tree represented by the multicast BMAC address, wherein the update comprises indicating that the switch is to be treated as an only transmitter for the multicast BMAC address, and other switches in an SPB network, that have previously sent the TLV, are to be treated as receivers for the multicast BMAC address.

8. The method of claim 1, further comprising signaling, to the network, that a plurality of SPB devices in the network should both transmit and receive packets for the multicast BMAC address.

9. The method of claim 8, wherein signaling, to the network, that the plurality of SPB devices in the network should both transmit and receive the packets for the multicast BMAC address comprises transmitting a Type-Length-Value ("TLV") for the multicast BMAC address with both a transmit bit ("TX") and a receive bit ("RX") bit set to 1.

10. The method of claim 1, wherein detecting that the switch has been newly-added to the network comprises detecting that the switch does not have an assigned multicast BMAC address.

11. A system for automatically assigning a Multicast Backbone Media Access Control ("BMAC") address to a switch that is newly-added to a network, the system comprising:
   control circuitry configured to:
      detect that the switch has been newly-added to the network;
      in response to detecting that the switch has been newly-added to the network:
         retrieve a plurality of Media Access Control ("MAC") addresses assigned to the switch by default;
         select a MAC address from the plurality of MAC addresses;
         access, in the MAC address, a bit that indicates whether the MAC address is a unicast address or a multicast address;
         modify the bit in the MAC address to transform the MAC address into a multicast MAC address;
         generate, based on the transformed MAC address, a multicast BMAC address; and
         assign the multicast BMAC to the switch.

12. The system of claim 11, wherein the control circuitry is further configured to:
   add the multicast BMAC address to an entry of a database; and
   transmit a signal onto the network to propagate information within the entry to nodes connected to the network.

13. The system of claim 11, wherein the control circuitry is further configured, when modifying the bit in the MAC address, to transform the MAC address into the multicast MAC address, to modify bit 40 of the MAC address.

14. The system of claim 11, wherein the control circuitry is further configured to signal with the modified MAC address that the modified MAC address is globally unique.

15. The system of claim 14, wherein the control circuitry is further configured, when signaling with the modified MAC address that the modified MAC address is globally unique, to maintain bit 41 set at 0 to indicate that the modified MAC address is globally unique.

16. The system of claim 15, wherein the signal comprises a link state packet that includes the multicast BMAC address in a Type-Length-Value ("TLV") format.

17. The system of claim 16, further comprising a second switch, wherein the second switch is configured to:
   receive the link state packet;
   determining that the link state packet contains the TLV for the multicast BMAC address; and
   in response to determining that the link state packet contains the TLV for the multicast BMAC address, update a multicast tree represented by the multicast BMAC address, wherein the update comprises indicating that the switch is to be treated as an only transmitter for the multicast BMAC address, and other switches in an SPB network, that have previously sent the TLV, are to be treated as receivers for the multicast BMAC address.

18. The system of claim 11, wherein the control circuitry is further configured to signal, to the network, that a plurality of SPB devices in the network should both transmit and receive packets for the multicast BMAC address.

19. The system of claim 18, wherein the control circuitry is further configured, when signaling, to the network, that the plurality of SPB devices in the network should both transmit and receive the packets for the multicast BMAC address, to transmit a Type-Length-Value ("TLV") for the multicast BMAC address with both a transmit bit ("TX") and a receive bit ("RX") bit set to 1.

20. The system of claim 11, wherein the control circuitry is further configured, when detecting that the switch has been newly-added to the network, to detect that the switch does not have an assigned multicast BMAC address.

* * * * *